(12) United States Patent
Coe et al.

(10) Patent No.: US 10,940,584 B1
(45) Date of Patent: Mar. 9, 2021

(54) ROBOTIC CONTROL

(71) Applicant: X Development LLC, Mountain View, CA (US)

(72) Inventors: Sarah Coe, Mountain View, CA (US); Yuchen Wu, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 313 days.

(21) Appl. No.: 15/963,630

(22) Filed: Apr. 26, 2018

(51) Int. Cl.
- *B25J 9/16* (2006.01)
- *B25J 19/00* (2006.01)
- *G06F 8/40* (2018.01)

(52) U.S. Cl.
CPC ............. *B25J 9/163* (2013.01); *B25J 19/00* (2013.01); *G06F 8/40* (2013.01); *Y10S 901/09* (2013.01)

(58) Field of Classification Search
None
See application file for complete search history.

(56) References Cited

U.S. PATENT DOCUMENTS

| | | | | |
|---|---|---|---|---|
| 4,663,726 A | * | 5/1987 | Chand | G05B 19/353 318/573 |
| 6,339,433 B1 | * | 1/2002 | Politis | G06T 15/503 345/581 |
| 6,782,306 B2 | * | 8/2004 | Yutkowitz | G05B 19/4103 700/159 |
| 9,775,682 B2 | | 10/2017 | Quaid et al. | |
| 2007/0094317 A1 | * | 4/2007 | Wang | H03H 17/0685 708/290 |
| 2010/0097448 A1 | * | 4/2010 | Gilbert | G06T 3/60 348/51 |
| 2014/0297031 A1 | * | 10/2014 | Iwasaki | B25J 9/1664 700/245 |
| 2016/0379519 A1 | * | 12/2016 | Gupta | G09B 5/02 434/118 |
| 2017/0109863 A1 | * | 4/2017 | Jacques | G06T 11/203 |
| 2019/0346819 A1 | * | 11/2019 | Kroner | G06F 8/34 |

FOREIGN PATENT DOCUMENTS

WO    WO 2018/026503    2/2018

OTHER PUBLICATIONS

Kano et al. "B-Splines and control theory," Applied mathematics and computation, 145.2-3, Dec. 2003, 24 pages.
Hai et al. "The Robot Motion Trajectory Algorithm Research Based on B-Spline and new Velocity Planning," IEEE Control and Decision Conference, May 2016, 7 pages.

* cited by examiner

*Primary Examiner* — Jeff A Burke
*Assistant Examiner* — Zachary Joseph Wallace
(74) *Attorney, Agent, or Firm* — Fish & Richardson P.C.

(57) ABSTRACT

Methods, systems, and apparatus, including computer programs encoded on a computer storage medium, for receiving, by one or more non-real-time processors, data defining a light illumination pattern for a robotic device. Generating, by the one or more non-real-time processors and based on the data, a spline that represents the light illumination pattern, where a knot vector of the spline defines a timing profile of the light illumination pattern. Providing the spline to one or more real-time processors of the robotic system. Calculating, by the one or more real-time processors, an illumination value from the spline at each of a plurality of time steps. Controlling, by the one or more real-time processors, illumination of a lighting display of the robotic system in accordance with the illumination value of the spline at each respective time step.

20 Claims, 5 Drawing Sheets

ROBOTIC CONTROL

BACKGROUND

Autonomous devices, such as robotic devices, are capable of producing animated effects on light displays and coordinating motions with the animated effects. Present development techniques to drive such functions can be complex and may be suitable for inclusion in higher-level application development for robotic devices. Furthermore, translating high-level animations into hardware level control signals can be resource intensive and may require more computation resources that exceed those of control processors for some robotic devices.

SUMMARY

In general, the disclosure relates to a process for controlling lighting displays and motion of a robotic device. More specifically, the disclosure relates to a process controlling lighting displays and motion of a robotic device based on high-level program code or animation files (e.g., Adobe After Effects® files). For example, a robot can translate high-level programming data into a basis spline, e.g., a piecewise polynomial parametric curve, that represents a light illumination pattern that changes over time. The light illumination pattern may represent an animated effect produced by changing light values of individual LEDs on the robot. The robot can calculate lighting values at particular time steps over a duration of the lighting pattern using the basis spline. The robot can then control individual lights on the robot in accordance with the lighting values. For example, a control processor in the robot can use the calculated lighting values to drive a lighting display to produce an animation defined by the basis spline. In some implementations, a knot vector of the spline defines a timing profile of the light illumination pattern. For example, the knot vector may be a mathematical representation of the variation (e.g., degree of variation) in colors, brightness, and position within a display of the lighting effects over time.

The basis spline may serve as an efficient data structure for translating between high-level programming data and lower-level real-time control operations of the robot. For example, the basis spline provides an efficient transition between non-real time operations of the robot performed by a first processor and real-time control operations performed by a second processor.

In some implementations, a robot can implement a similar process to control motion. For example, the robot can translate high-level programming data into a basis spline that represents a pattern of motion executed over a period of time. The motion pattern may represent a series of positions the robot's limb must traverse to execute the motion. The robot can calculate position values at particular time steps over motion pattern using the basis spline. The robot can then control a limb or limbs to execute the motion in accordance with the position values. For example, a control processor in the robot can use the calculated lighting values to drive one or more motors to produce motion pattern defined by the basis spline. In some implementations, a knot vector of the spline is exposed to define a timing profile. For example, the knot vector may be a mathematical representation of variations in position of a robotic limb within space over time and movement of the limb as it transitions between positions. For example, the knot vector may mathematically describe aspects of the motion such as velocity, acceleration, and jerk of the limb as it transitions between positions.

In general, innovative aspects of the subject matter described in this specification can be embodied in methods that include the actions of receiving, by one or more non-real-time processors, data defining a light illumination pattern for a robotic device; generating, by the one or more non-real-time processors and based on the data, a spline that represents the light illumination pattern, where a knot vector of the spline defines a timing profile of the light illumination pattern; providing the spline to one or more real-time processors of the robotic system; calculating, by the one or more real-time processors, an illumination value from the spline at each of a plurality of time steps; and controlling, by the one or more real-time processors, illumination of a lighting display of the robotic system in accordance with the illumination value of the spline at each respective time step. Other implementations of this aspect include corresponding systems, apparatus, and computer programs, configured to perform the actions of the methods, encoded on computer storage devices. These and other implementations can each optionally include one or more of the following features.

Some implementations include the steps of: receiving, by one or more non-real-time processors, data defining a motion pattern for a robotic system; generating, by the one or more non-real-time processors and based on the data, a second spline that represents the motion pattern, wherein a knot vector of the second spline defines a second timing profile that represents timing of the motion pattern; synchronizing, by the one or more non-real-time processors, the timing profile of the light illumination pattern and the second timing profile; providing the second spline to one or more real-time processors; calculating, by the one or more real-time processors, a position value from the second spline at each of a plurality of time steps; and controlling, by the one or more real-time processors, a movement of the robotic device in accordance the position value of the second spline at each respective time step.

In some implementations, the data defining the light illumination pattern is an animation file.

In some implementations, the data defining the light illumination pattern includes programming code that describes the light illumination pattern by defining an illumination line segment for the lighting display.

In some implementations, the programming code includes a start point and an end point for the line segment.

In some implementations, the programming code includes an indication of a time dependent transition of the line segment.

In some implementations, the knot vector of the spline mathematically represents the time dependent transition.

In some implementations, the calculating an illumination value from the spline at each of a plurality of time steps includes determining that two or more illumination line segments overlap, and calculating illumination values for overlapping portions of the line segments based on blending colors in the overlapping portions.

In some implementations, the plurality of time steps correspond with an operating frequency of the one or more real-time processors.

Particular implementations of the subject matter described in this specification can be implemented so as to realize one or more of the following advantages. Implementations may provide standardized programming protocols that permit developers to seamlessly control detailed animation and motion aspects of robotic devices. For example, implementations provide a robotic system control architecture that can efficiently translate high-level programming data to specific control signals for driving robotic device displays and movements. Implementations may improve efficiency of complex robotic control operations. For example, implementations distribute processing operations between non-real-time and real-time processors to leverage translate high-level program data into control signals to perform real-time control of robotic operations. As another example, implementations generate splines to describe complex robotic control and pass control information between non-real-time and real-time processors. The splines represent the control information in a highly efficient structure and reduce the complexity of data that is transferred between processors. Implementations make programming lighting motion robust to the number of LEDs on a given robotic device. For example, implementations can process high-level programming data that is agnostic to the specific number of LEDs on a given robotic device. Thus, such implementations permit portability of application code across a wide range of robotic devices without adversely affecting the execution of the code on any particular robotic device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
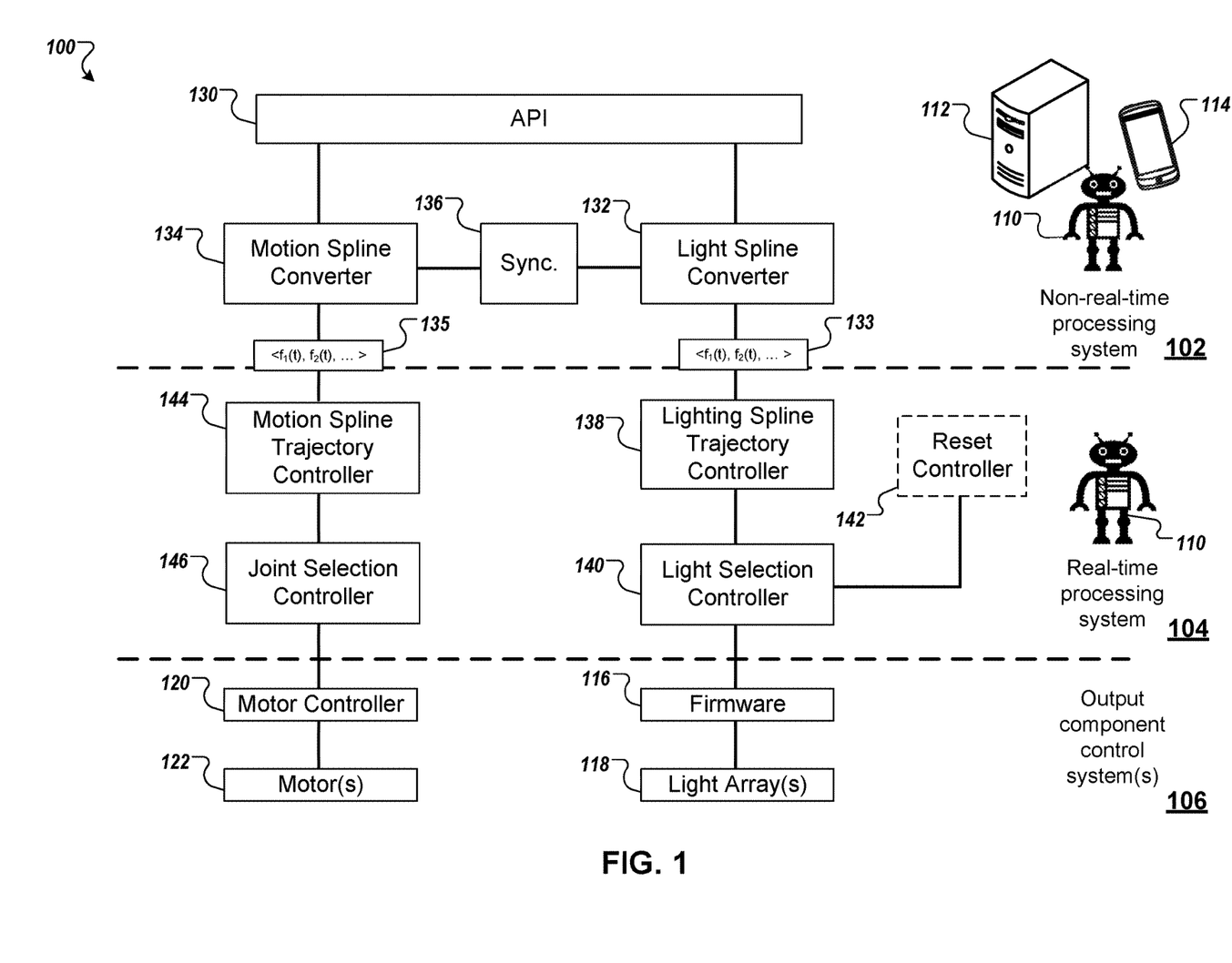
FIG. 1 is a diagram that illustrates an example of a system architecture for controlling aspects of a robotic device.

FIG. 1 is a diagram that illustrates an example architecture of a system 100 for controlling functions of a robotic device 110. The system 100 includes a non-real-time processing system 102, a real-time processing system 104, and one or more output component control systems 106. As discussed in more detail below, the non-real-time processing system 102 receives high-level programming data, e.g., animation files or high-level program code (e.g., Java code), that defines a time dependent function of a robotic device 110. Example time dependent functions include, but are not limited to, lighting illumination patterns that vary over time to create animated effects and patterns of motion for one or more joints or limbs of a robotic device 110. The non-real-time processing system 102 converts the high-level programming data into a spline that represents the robotic device function defined by the high-level programming data. The spline serves as an efficient data structure for translating the high-level description of robotic functions into mathematical functions that can be evaluated and executed by the real-time processing system 104. The real-time processing system 104 uses the spline to segment the robotic function represented by the spline into discrete time steps. The real-time processing system 104 calculates output control values for each time step that indicate a desired state of one of the robotic device's output components, e.g., a light array illumination value or a limb position value, during the time step in order to execute the function. The real-time processing system 104 controls the robotic device's output component control systems 106 to drive one of more output components, e.g., individual motors or lighting elements, in accordance with the calculated control values at each time step, thereby, executing the robotic function.

The non-real-time processing system 102 can include, but is not limited to, a processing system of a robotic device 110 or a separate computing device such as a server system 112 or a user computing device 114. User computing devices 114 can include, but are not limited to, desktop computers, laptop computers, tablet computers, or smartphones. The real-time processing system 104 includes one or more processors, controllers, or both that are part of a robotic device 110. The real-time processing system 104 provides outputs that directly control the real-time functions of one or more output components of the robotic device 110. The output component control systems 106 include interfaces, controllers, or both that drive output components of a robotic device 110. For example, output component control systems can include, but are not limited to, light driver firmware 116 for driving a light array 118, e.g., an LED array, on robotic device 110, or motor controllers 120 for driving a system of motors 122, e.g., to control the motion of a mechanical joint on a robotic device 110.

The non-real-time processing system 102 performs operations that generally do not control real-time functions of a robotic device 110. For example, the non-real-time processing system 102 does not produce output data that is necessarily time synchronized with function of a robotic device 110. For example, the non-real-time processing system 102 output data from the non-real-time processing system 102 can be stored in memory for use by the real-time processing system 104 when needed to execute a function of the robotic device 110. In some examples, operations performed by the non-real-time processing system 102 can be considered as pre-processing operations. In the depicted example, the non-real-time processing system 102 includes an application program interface (API) 130, a light spline converter 132, a motion spline converter 134, and a synchronizer 136. In some examples, the API 130, light spline converter 132, motion spline converter 134, and synchronizer 136 are provided as one or more computer executable programs, which can be executed by the non-real-time processing system 102. In some implementations, some or all of the components of the non-real-time processing system 102 can be implemented in hardware, e.g., some or all of the components can be implemented in an field programmable gate array (FPGA) or an application specific integrated circuit (ASIC).

In some examples, the API 130 is a component of the non-real-time processing system 102 that receives high-level programming data for defining functions for robotic devices 110. For example, high-level programming data defining robotic functions can include animation files or high-level programming code that define robot lighting effects or motion. In some examples, the API 130 permits robotic program developers to control finely tuned robotic functions using high-level code, animation data files, or both. For example, the API 130 can provide programming instructions, definitions, protocols, subroutines, or a combination thereof that permit developers to define functions, e.g., movements and lighting animations, for robotic devices. In some examples, the API 130 provides rules or other criteria for defining robotic functions using animation data files, e.g., Adobe After Effects files.

In some examples, the API 130 defines a set of robotic function attributes that a developer can vary in order to control time dependent robotic functions such as lighting animation patterns and motion. In some examples, the robotic function definitions of the API 130 are agnostic to the type or characteristics of the particular hardware on individual robotic devices that perform the desired functions. In other words, the API 130 definitions are independent of hardware characteristics such as the type of lighting elements that on a particular robot (e.g., LED arrays vs. LCD array), the number of lighting elements in a light array of a particular type of robot, motor drive characteristics for motors that operate robotic joints, the number of motors a particular type of robot uses to move a joint, etc.

In some examples, the high-level programming protocols and definitions provided by the API 130 can serve as standardized programming protocols for controlling robotic joints or limbs. For example, a limb motion can be represented by a series of positions for the limb that describe the desired motion or part of the desired motion. In addition, transitions between the positions represented by motion transitions types that describe how the limb should move from one position to another. Motion transition types can describe characteristics of the movement from position to position that include, but are not limited to, velocity, acceleration, and jerk. The motion transition type can indicate a mathematical interpolation of motion between joint positions, which can be represented by a spline.

Figure 2:
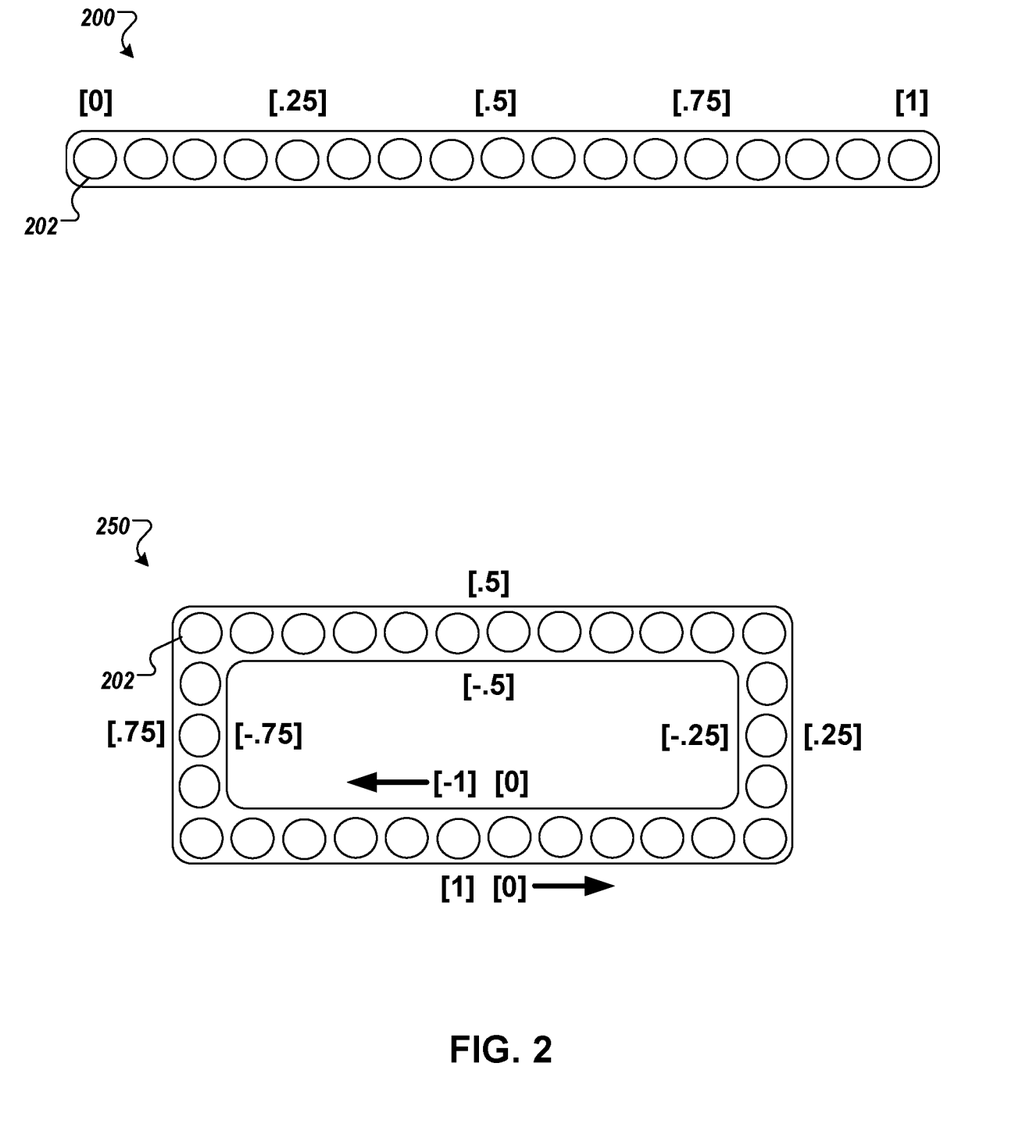
FIG. 2 is a diagram showing different types of example light arrays for a robotic device.

For example, FIG. 2 illustrate two example light arrays of a robotic device. The first light array is an example of a linear light array 200 and the second light array is an example of a ring light array 250. Each of the light arrays is made up of an array of lighting elements 202. The lighting elements 202 can be, but are not limited to, LEDs, LCD segments or pixels, organic LEDs (OLED), carbon nanotube display elements, or quantum dot display elements. Furthermore, various types of robotic devices may include light arrays of different sizes with different numbers of lighting elements 202.

In some examples, the high-level programming protocols and definitions provided by the API 130 can serve as standardized programming protocols for driving the light arrays. For example, the API 130 can represent a light array as an indexed line in high-level programming code. For example, each light array 200, 250 is illustrated in FIG. 2 with a set of line indices that are normalized to range from [0] to [1] to cover the entire array. For the linear array 200 the indices may range from [0] to [1] moving left to right across the array. For the ring array 250 the indices may begin and end at the six o'clock position.

In some examples, the API 130 can permit a developer to control the light array by defining line segments to be illuminated using the indices. For example, light array animation can be control by allowing the developer to define a lighting pattern by controlling API provided variables associated with one or more illumination line segments of the array. Line segment variables can include, but are not limited to, line segment start and end points, a time duration for illumination, an illumination color represented by an RGB value, a color transition type, an illumination intensity transition type, a sequence transition type, and an opacity value.

In some examples, a line segment for illumination is defined by its start and end point as represented by two indices. For example, a line segment [0.25]-[0.75] on the linear array 200 would extend across the middle half of the array. The same line segment (e.g., [0.25]-[0.75]) on the ring array 250 is ambiguous and could extend along the upper or lower half of the ring. Thus, indices for a ring array may include positive and negative values to indicate a direction around the array, e.g., counter clockwise may be positive values and clockwise may be negative values. For example, the line segment defined by [0.25]-[0.75] would represent the upper half of the ring array 250 and the line segment defined by [−0.25]-[0.25] would represent the lower half of the ring array 250.

In some examples, the start and end point can each be associated with a different illumination color. In such examples, the color transition type can indicate how the color of the line segment should transition from the color of the start point to the color of the end point. Color transition types can include, but are not limited to, linear transitions, exponential transitions, and abrupt transitions, e.g., step-functions. The transition type can indicate a mathematical interpolation of the line segment colors between the start and end points, which can be represented by a spline. In some examples, the color transition of a line segment over time can be referred to as a color trajectory.

In some examples, temporal aspects of the line segment (e.g., animations) can be represented by an illumination duration variable, an illumination intensity transitions type variable, or both. For example, a duration variable can indicate how long the line segment is to be illuminated. The duration variable can also be paired with a transition type. For example, the duration can indicate a period of time over which a transition of the line segment should elapse. The transition type can give the appearance that the light segment is fading in or fading out. For example, the transition variable may indicate that the line segment is to increase in brightness (e.g., illumination intensity) linearly over a duration of two seconds. Illumination intensity transitions types can include, but are not limited to, linear transitions, exponential transitions, and abrupt transitions, e.g., step-functions. The transition type can indicate a mathematical interpolation of the manner in which the line segment is to be illuminated, which can be represented by a spline.

In some examples, the illumination intensity transitions and duration can indicate a temporal sequence for illuminating individual lighting elements in the light array. The temporal sequence can give the appearance that the line segment is moving along the array. For example, the illumination intensity transitions can indicate a timing sequence for illuminating individual lighting elements from the start point to the end point. The duration can indicate the total time over which the transition should take place. Illumination sequence transition types can include, but are not limited to, linear sequential transitions, exponential sequential transitions, and abrupt sequential transitions, e.g., step-functions. The sequential transition type can indicate a mathematical interpolation of a sequence for illuminating light elements along a line segment, which can be represented by a spline.

Figure 3:
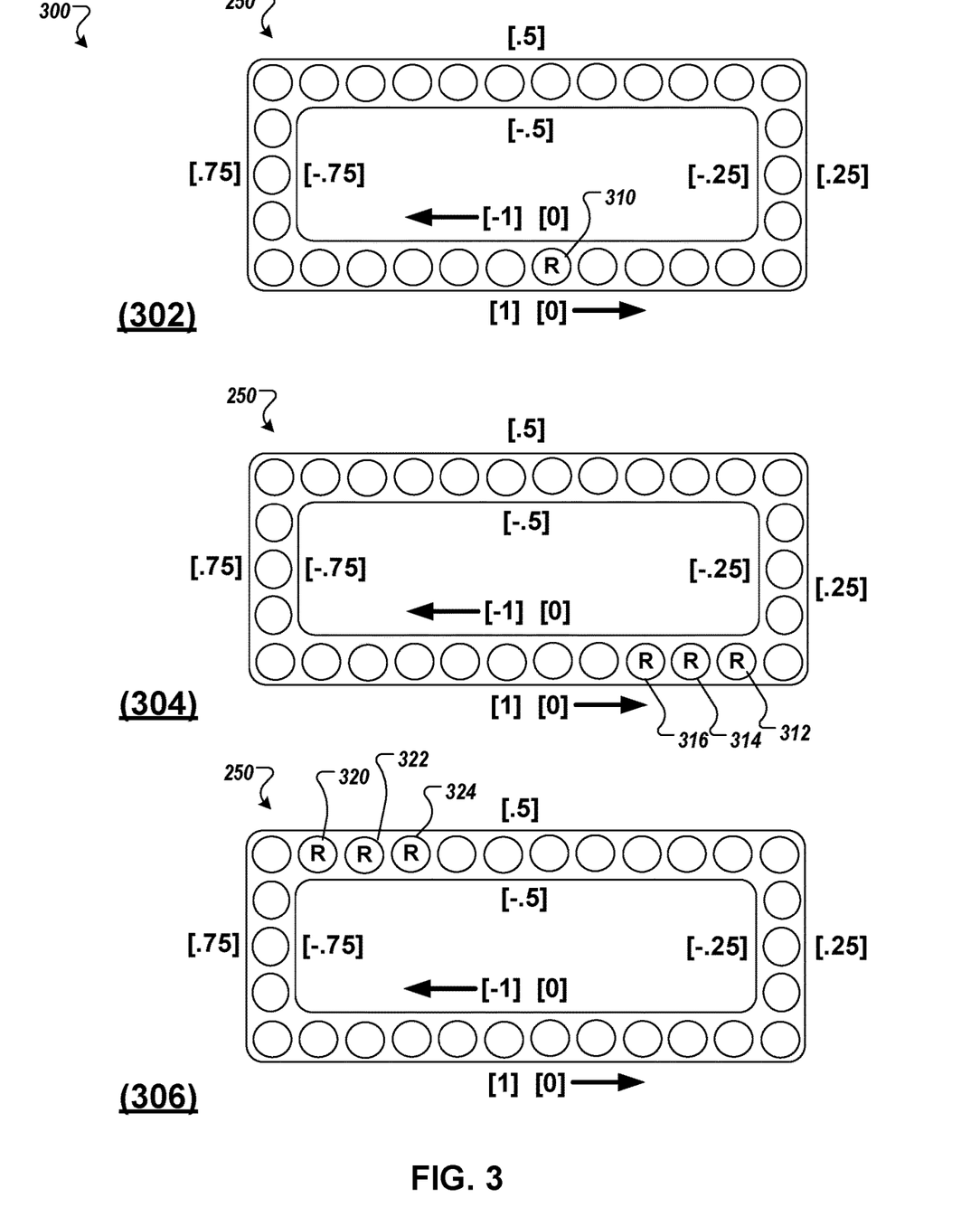
FIG. 3 is a diagram that illustrates an example light animation process according to implementations of the present disclosure.

FIG. 3 illustrates an example light animation process 300 in a series using a series of diagrams (302-306) of the ring array 250. For example, a line segment of the ring array 250 may be defined by a start point, an endpoint of, a sequential transition type of a linear sequence, and a duration for the transition of two seconds. Each start and end point can be indicated by a pair of light array indices, e.g., to indicate the length of the line segment. Further, intermediate line segment points in addition to the startpoint and endpoint also may be defined. This high-level definition of a line segment describes an illumination pattern that illuminates each light element in the ring array 250 sequentially in a counter clockwise direction over the duration of two seconds. For instance, diagram 302 represents the ring array 250 at a first time with the line segment animation just beginning. In diagram 302, light element 310 is illuminated in red (R) at the start point of the line segment (e.g., index [0, 0.033]). Diagram 304 represents the ring array 250 at a second time in the animation of the line segment (e.g., index [0.067, 0.167]. In diagram 304, three light elements 312-316 are illuminated in red as the segment begins to traverse the ring array 250. For example, the leading light element 312 may be in the process of turning on, the middle light element 314 may be fully illuminated, and the trailing light element 316 may be dimming as it is turned off. In some implementations, the sequential transition type also describes how each light element energizes over time (e.g., how quickly it is faded on or off). Finally, diagram 306 represents the ring array 250 at a third time in the animation of the line segment (e.g., index [0.567, 0.667]). In diagram 306, three light elements 320-324 are illuminated in red as the segment continues to traverse the ring array 250 in the counterclockwise direction.

As another example, a second line segment of the ring array 250 may be defined by a start point of [−1], an end point of [0], a sequence transition type of a linear sequence, and a duration for the transition of two seconds. This high-level definition of a second line segment describes an illumination pattern that illuminates each light element in the ring array 250 sequentially in a clockwise direction over the duration of two seconds.

In some implementations, line segment points greater than 1 can indicate multiple rotations around a ring array 250. As another example, a third line segment of the ring array 250 may be defined by a start point of [0, 0.1], an end point of [4.9, 5], a sequence transition type of a linear sequence, and a duration for the transition of two seconds. This high-level definition of a second line segment describes an illumination pattern that illuminates each light element in the ring array 250 sequentially in a counter clockwise direction for five revolutions around the array over the duration of two seconds.

Referring again to FIG. 1, in some implementations, the non-real-time processing system 102 preprocesses animation files. For example, some animation files represent time as a dependent variable in functions defining the animation. This can create excessive processing overhead, processing errors, or both when converting a robot lighting animation or robot motion defined in the animation file into a spline. In such implementations, the non-real-time processing system 102 can convert the time related variables in the animation file from dependent variables to independent variables. For example, the non-real-time processing system 102 can read the animation file and approximate a timing profile for the robotic function. Using an Adobe After Effects® Butterfly file as an example, the non-real-time processing system 102 can approximate a series of cubic Bezier curves defined in the file into a single spatial spline with knot vectors that represent the timing profile of the animation, and, by extension, the desired robotic function. For example, the non-real-time processing system 102 can use a linear least-squares regression to minimize errors in control points generated by the approximation. The non-real-time processing system 102 can increase the number of knots in the knot vector and recalculate the regression if the control point error exceeds a predefined error threshold.

In some implementations, the API 130 can directly expose spline generation primitives. For example, the API 130 can provide programming protocols that permit a developer to specify robotic functions by providing a set of spline control points and knots. In such implementations, the spline converters 132/134 can pass the spline control points and knot vector to an appropriate one of the spline trajectory controllers 138/144 of the real-time processing system 104. In some implementations, the spline converters 132/134 can check developer defined spline control points and knots for errors prior to passing them to the real-time processing system 104.

The light spline converter 132 generates a lighting spline 133 that represents a light illumination pattern defined by the high-level programming data. For example, the light spline converter 132 can translate the high-level programming data into a basis spline, e.g., a third-order basis spline, which represents changes in the light illumination pattern over time. For example, the light spline converter 132 can determine a timing profile for the light illumination pattern based on attributes of the illumination pattern including, but not limited to, the color transition type, the illumination intensity transitions type, and the sequence transition type. The light spline converter 132 can represent the timing profile as a set of piecewise functions that mathematically describe the desired lighting animation. In other words, light spline converter 132 can generate the timing profile based on high-level programming code that defines the lighting pattern. For example, the timing profile can be determined based on the lighting pattern transitions defined by the programming code. The timing profile may represent, e.g., the timing of changes in color, intensity, and illumination sequences for appropriate portions of one or more lighting displays on the robotic device. In some examples, the knot vector equations are a mathematical representation of the timing profile.

In some examples, the light spline converter 132 can translate data from an animation file into a spline representation of lighting animation defined by the file. For example, the light spline converter 132 can extract key frames from the animation file and generate a spline based on interpolating transitions in a lighting pattern between the key frames.

In some implementations, a knot vector of the lighting spline 133 can define the timing profile of the light illumination pattern to generate the animated effect. For example, the knot vector can serve as a mathematical representation of the variation in colors, brightness, and position (within a display) of the lighting effects as a function of time.

The motion spline converter 134 generates a motion spline 135 that represents a motion pattern defined by the high-level programming data. For example, the motion spline converter 134 can translate the high-level programming data into a basis spline, e.g., a third-order basis spline, which represents a series of positions, which a robotic limb must traverse to execute the motion. For example, the motion spline converter 134 can determine a timing profile for the motion pattern based on the limb positions and motion transition types between positions. The motion spline converter 134 can represent the timing profile as a set of piecewise functions that mathematically describe the desired motion of the limb. In some examples, the motion spline converter 134 can translate data from an animation file into a motion spline 135 representation of lighting animation defined by the file. For example, the motion spline converter 134 can extract key frames from the animation file. The key frames may provide a series of discrete positions for the limb to execute the animation. The motion spline converter 134 can generate a motion spline 135 based on interpolating motion transitions between the key frames.

In some implementations, a knot vector of the motion spline 135 can define the timing profile of the motion pattern. For example, the knot vector can serve as a mathematical representation of the variation in limb position and transitions between positions as a function of time.

The synchronizer 136 synchronizes the timing of lighting and motion patterns for robotic functions that include both lighting and motion aspects. For example, the synchronizer 136 can synchronize light illumination and motion timing profiles between two splines to ensure that a robotic device's 110 motion and lighting patterns are executed properly. For instance, a particular animation sequence may require a robotic device to accelerate a limb faster than the motors of the device are capable of moving the limb. In such situations, the motion spline converter 134 can adjust the acceleration of the limb as represented by a motion spline 135 to a value that is within the capabilities of the robotic device's motors. In response, the synchronizer 136 can make similar adjustments to the lighting spline 133 to maintain synchronization between the desired motion and light animation.

In some examples, a desired motion function for a robotic device 110 may require that a joint be moved to an initial starting position before beginning a motion. For example, a particular motion pattern for a limb may require the limb be driven to a starting position. If such a motion pattern is associated with a lighting animation, the synchronizer can delay the lighting animation while repositioning a limb to ensure that both the motion and the lighting animation begin at the same time. For example, the synchronizer 136 can insert or cause the light spline converter 132 to insert a delay period into the beginning of the lighting spline 133 that accounts for a period of time during which the limb is repositioned.

The real-time processing system 104 controls the execution of robotic functions in real-time. For example, the real-time processing system 104 can include one or more control processors that process lighting and/or motions splines to control the illumination of light arrays and/or robot motion in real-time. In the depicted example, the real-time processing system 104 includes a lighting spline trajectory controller 138, a light selection controller 140, an, optional, reset controller 142, a motion spline trajectory controller 144, and a joint selection controller 146. In some examples, the lighting spline trajectory controller 138, light selection controller 140, reset controller 142, motion spline trajectory controller 144, and joint selection controller 146 are provided as one or more computer executable programs, which can be executed by the real-time processing system 104. In some examples, the real-time processing system 104 operates with a 250 Hz execution loop. In other words, instructions are processed and new commands or control signals are transmitted to output hardware of the robotic device 110 approximately every 4 ms. In other implementations, the real-time processing system 104 operates with a 1000 Hz to 100 Hz execution loop. In some implementations, some or all of the components of the real-time processing system 104 can be implemented in hardware, e.g., some or all of the components can be implemented in an FPGA or an ASIC.

The lighting spline trajectory controller 138 receives lighting splines 133 from the non-real-time processing system 102 and determines discrete lighting values for each light element in a light array based on one or more lighting splines 133. For example, the lighting spline trajectory controller 138 can calculate an illumination value for individual light elements of an array from a lighting spline 133. In some examples, the spline may define lighting values for every light element in an array. That is the spline may evaluate to a zero illumination value for non-illuminated light elements. In some examples, the spline may only define lighting values for light elements that are within an illumination line segment, e.g., light elements that will be illuminated. In some examples, the spline may only define lighting values for key light elements of an illumination line segment of a light array. In such examples, the lighting spline trajectory controller 138 can interpolate illumination values for non-key light elements that are within the illuminated line segment from the illumination values of the key light elements. Illumination values can include, but are not limited to, a light intensity value that indicates a brightness level for a light element and a color value that indicates a color of a light element. The color value can be, e.g., an RGB (red-green-blue) array or an RGBW (red-green-blue-white) array.

In some implementations, the lighting spline trajectory controller 138 calculates illumination values from the lighting spline 133 for light elements of a light array 118 at discrete time steps. In some examples, the time steps can correspond to the operating frequency of the real-time processing system 104.

In some implementations, the lighting spline trajectory controller 138 can process two or more light array line segments simultaneously. Multiple illumination line segments can be defined by multiple splines that share a knot vector and are processed concurrently. When multiple line segments overlap on a light array 118, the lighting spline trajectory controller 138 can blend the colors of the overlapping line segments. For example, the lighting spline trajectory controller 138 can use alpha blending techniques to blend overlapping portions of line segments.

Figure 4:
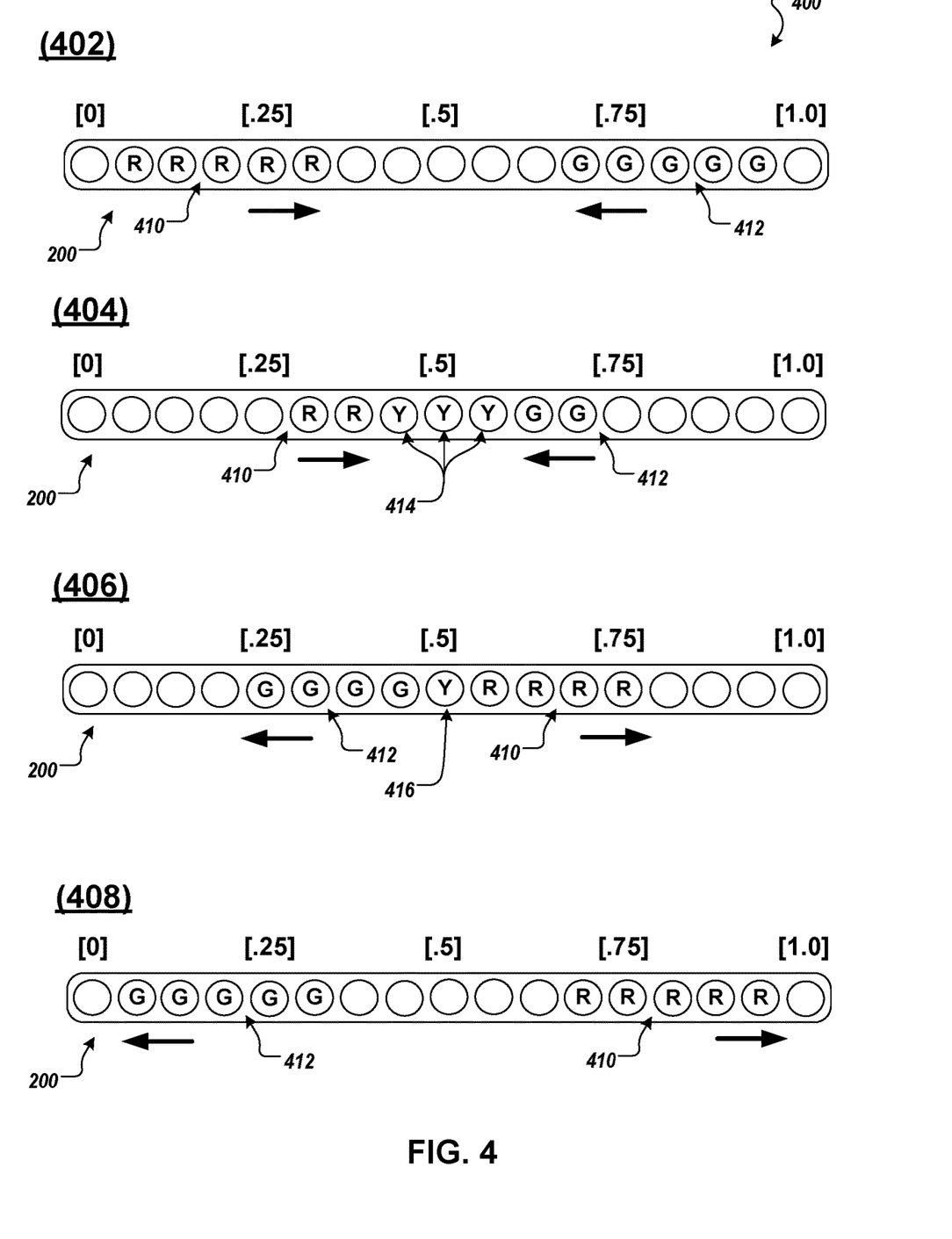
FIG. 4 is a diagram that illustrates another example light animation process according to implementations of the present disclosure.

FIG. 4 provides an illustrative example of line segment blending. FIG. 4 illustrates an example of a light animation and blending process 400 using a series of diagrams (402-408) of the linear array 200 (from FIG. 2). Each diagram represents the linear array as illuminated during a time step of the lighting spline trajectory controller 138. Diagram 402 shows a red (R) line segment 410 traversing the linear array 200 in a left to right direction and a green (G) line segment 412 traversing the linear array 200 in a right to left direction. In diagram 404, the red line segment 410 and the green line segment 412 begin to intersect at light elements 414. The lighting spline trajectory controller 138 computes a yellow (Y) illumination value for light elements 414 by alpha blending illumination values computed for light elements 414 based on the lighting spline (or splines) that define the red line segment 410 and the green line segment 412. In diagram 406, the red line segment 410 and the green line segment 412 have passed each other as they traverse the linear array 200 in their respective directions. Thus, the green line segment 412 is now shown on the left side of the linear array 200 and the red line segment 410 is now shown on the right side of the linear array 200. However, the two line segments still overlap at light element 416, the illumination values of which are alpha blended to produce yellow. In diagram 408, the red line segment 410 and the green line segment 412 no longer overlap; therefore, the lighting spline trajectory controller 138 no longer blends the line segments.

Referring again to FIG. 1, the light selection controller 140 receives light element illumination values from the lighting spline trajectory controller 138 and provides control signals to the firmware 116 to drive the light arrays 118 on a robotic device 110. For example, the light selection controller 140 receives illumination values from the lighting spline trajectory controller 138 during each time step. The light selection controller 140 parses the illumination values and can send control signals to firmware 116 to drive appropriate light elements of the light arrays 118.

Referring again to FIG. 1, the reset controller 142 provides non-spline based control of the light arrays 118. For example, the reset controller 142 can provide forced controls or manual controls for the light array 118. The reset controller 142 can be used to reset one or more light arrays 118 by, e.g., turning all light elements off or to a predefined illumination value (e.g., white).

The motion spline trajectory controller 144 receives motion splines 135 from the non-real-time processing system 102 and determines discrete position values for one or more limbs or joints of the robotic device 110. For example, the motion spline trajectory controller 144 can calculate position values for individual limbs of the robotic device 110 from the motion spline 135. In some implementations, the motion spline trajectory controller 144 calculates position values from the motion spline 135 for the robotic device 110 at discrete time steps. In some examples, the time steps can correspond to the operating frequency of the real-time processing system 104.

The joint selection controller 146 receives position values from the motion spline trajectory controller 144 and provides control signals to the motor controllers 120 to drive the motors 122 to move appropriate limbs of the robotic device 110. For example, the joint selection controller 146 receives position values from the motion spline trajectory controller 144 during each time step. The joint selection controller 146 selects appropriate joints and motors to operate in order to move associated limbs from one position to another based on the position values. The joint selection controller 146 provides control signals to the motor controller 120 to drive the motors 122 that operate the robotic device's 110 limbs.

Figure 5:
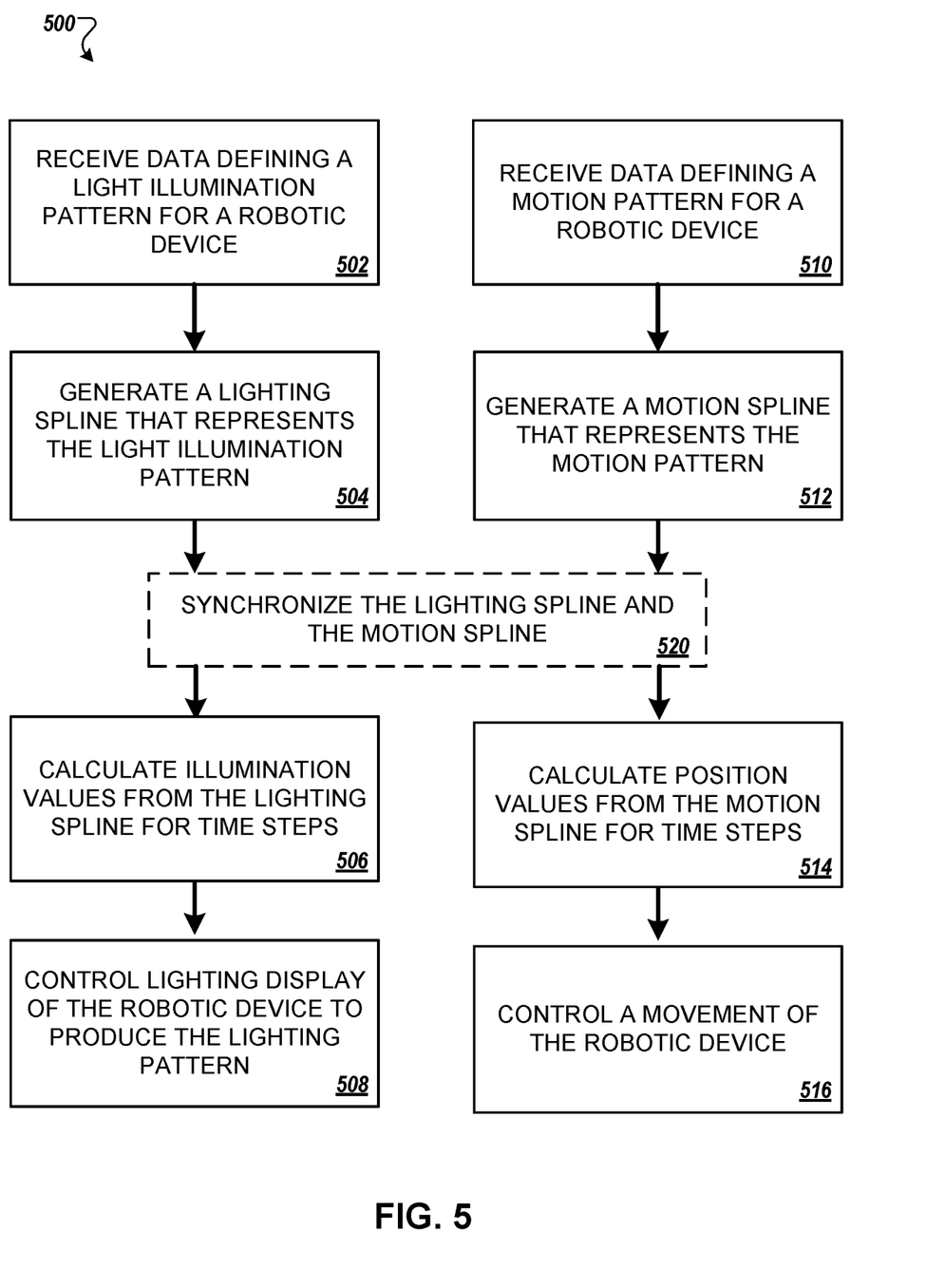
FIG. 5 is a flow diagram that illustrates an example of a process for controlling aspects of a robotic device.

FIG. 5 is a flow diagram that illustrate a process 500 for controlling a robotic device or a robotic system. The process 500 can be performed by one or more processing systems. For example, a robotic system can include a non-real-time processing system and a real-time processing system. Both processing systems may reside on a single robotic device or the robotic system may include a robotic device with a real-time processing system in communication with a non-real-time processing system that resides on another computing device (e.g., server system or user commuting device). As discussed above, some of the operations may be performed by a non-real-time processing system and some operations may be performed by a real-time processing system. Each set of steps 502-508 and steps 510-516 represent separate sub-process that can be performed separately or together. Step 520 is performed to synchronize the sub-processes, e.g., when a light animation and motion need to be synchronized.

The system receives data defining a light illumination pattern for a robotic device (502). For example, the light illumination pattern is a time dependent lighting pattern to produce an animated effect on a lighting display of the robotic device. The lighting display can include, e.g., one or more light arrays. The data can include high-level programming data that defines the light illumination pattern. For example, the data can be high-level programming code or an animation file. The data defines the characteristics of the lighting pattern including, but not limited to, illumination line segments, colors, opacity, illumination intensity, e.g., brightness, and lighting pattern transitions. Lighting pattern transitions can be time dependent or spatial. Lighting pattern transitions can include, but are not limited to, color transitions, illumination intensity transitions, and sequence transitions. Transitions can be defined by programming data indicating a desired transition type between states of the pattern and can include, but are not limited to, linear transitions, exponential transitions, geometric transitions, and abrupt transitions, e.g., step-functions.

The system generates a lighting spline that represents the light illumination pattern (504). For example, the system can generate a spline that mathematically represents the light illumination pattern as defined by the data received in step 502. For example, the system can translate the high-level programming data into a spline that mathematically defines the light illumination pattern over time. The system can determine a timing profile of the illumination pattern based on the high-level programming data and generate a spline with knot functions that represent the timing profile. For example, the system can generate the timing profile based on high-level programming code that defines the lighting pattern. For example, the timing profile can be determined based on the lighting pattern transitions defined by the programming code. The timing profile may represent the timing of changes in color, intensity, and illumination sequences for appropriate portions of one or more lighting displays on the robotic device. In some examples, the knot vector equations are a mathematical representation of the timing profile. As another example, the system extract key frames from the animation file and generate a spline based on interpolating transitions in the lighting pattern between the key frames.

The system calculates illumination values from the lighting spline (506). For example, the system calculates illumination values for portions of the light array(s) at discrete time steps based on the lighting spline. The lighting values may include a color value and an intensity value. For example, the color value can be an RGB or an RGBW array. In some examples, the time steps correspond to an operation frequency of one or more real-time processors. For example, the system can calculate illumination values at intervals that correspond to an operational period of the one or more real-time processors (e.g., the inverse of the operation frequency).

The system controls a lighting display on the robotic device to produce the lighting pattern (508). For example, the system can generate control signals for individual light elements of the light array(s) based on the illumination values. The system can provide the control signals to firmware that drives the light array(s) to produce a portion of illumination pattern during each time step.

The system receives data defining a motion pattern for the robotic device (510). For example, the motion pattern is a time dependent pattern to control movement of a limb of the robotic device, a joint of the robotic device, movement of the robotic device itself, or a combination thereof. The data can include high-level programming data that defines the light illumination pattern. For example, the data can be high-level programming code or an animation file. The data defines the characteristics of the motion pattern including, but not limited to, positions of a limb, joint, or the robotic device and transitions between positions. For example, motion transitions can describe characteristics of the movement from position to position that include, but are not limited to, velocity, acceleration, and jerk. The motion transition can indicate a mathematical interpolation of motion between joint positions, which can be represented by a spline. Motion transitions can be defined by programming data indicating a desired transition type between positions of the motion pattern and can include, but are not limited to, linear transitions, exponential transitions, geometric transitions, and abrupt transitions, e.g., step-functions.

The system generates a motion spline that represents the motion pattern (512). For example, the system can generate a spline that mathematically represents the motion pattern as defined by the data received in step 510. For example, the system can translate the high-level programming data into a spline that mathematically defines the motion pattern over time. The system can determine a timing profile of the motion pattern based on the high-level programming data and generate a spline with knot functions that represent the timing profile. For example, the system can generate the timing profile based on high-level programming code that defines the motion pattern. For example, the timing profile can be determined based on the positions and the motion pattern transitions defined by the programming code. The timing profile may represent the timing of changes in position. In some examples, the knot vector equations are a mathematical representation of the timing profile. As another example, the system extracts key frames from the animation file and generate a spline based on interpolating transitions in the motion pattern between the key frames.

The system calculates position values from the motion spline (514). For example, the system calculates position values for the robotic device at discrete time steps based on the motion spline. In some examples, the time steps correspond to an operation frequency of one or more real-time processors. For example, the system can calculate position values at intervals that correspond to an operational period of the one or more real-time processors (e.g., the inverse of the operation frequency).

The system controls a movement of the robotic device (516). For example, the system can generate control signals for individual motors or actuators of the robotic device to produce the desired motion pattern. The system can provide the control signals to motor controllers and/or firmware that drives the limbs or joints of the robotic device.

In some examples, the system synchronizes the lighting spline and the motion spline to synchronize the lighting animation with the motion of the robotic device (520). For example, the system can synchronize the timing of lighting and motion patterns for robotic functions that include both lighting and motion aspects. For example, the system can synchronize light illumination and motion timing profiles between two splines to ensure that a robotic device's motion and lighting patterns are executed in unison. For example, the system can adjust the timing of one or both of the splines to ensure that the lighting and motion patterns are performed by the robotic device in unison.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method for a controlling a robotic system, the method comprising:
   receiving, by one or more non-real-time processors, data defining a light illumination pattern for robotic system;
   generating, by the one or more non-real-time processors and based on the data, a spline that represents the light illumination pattern, wherein a knot vector of the spline defines a timing profile of the light illumination pattern;
   providing the spline to one or more real-time processors of the robotic system, wherein the one or more real-time processors are arranged to receive spline data and interface with one or more output component control systems of the robotic system;
   calculating, by the one or more real-time processors, an illumination value from the spline at each of a plurality of time steps; and
   controlling, by the one or more real-time processors, illumination of a lighting display of the robotic system in accordance with the illumination value of the spline at each respective time step.

2. The method of claim 1, further comprising:
   receiving, by the one or more non-real-time processors, data defining a motion pattern for a robotic system;
   generating, by the one or more non-real-time processors and based on the data, a second spline that represents the motion pattern, wherein a knot vector of the second spline defines a second timing profile that represents timing of the motion pattern;
   synchronizing, by the one or more non-real-time processors, the timing profile of the light illumination pattern and the second timing profile;
   providing the second spline to one or more real-time processors;
   calculating, by the one or more real-time processors, a position value from the second spline at each of a plurality of time steps; and
   controlling, by the one or more real-time processors, a movement of the robotic system in accordance the position value of the second spline at each respective time step.

3. The method of claim 1, wherein the data defining the light illumination pattern is an animation file.

4. The method of claim 1, wherein the data defining the light illumination pattern comprises programming code that describes the light illumination pattern by defining an illumination line segment for the lighting display.

5. The method of claim 4, wherein the programming code includes a start point and an end point for the line segment.

6. The method of claim 4, wherein the programming code includes an indication of a time dependent transition of the line segment.

7. The method of claim 6, wherein the knot vector of the spline mathematically represents the time dependent transition.

8. The method of claim 1, wherein calculating an illumination value from the spline at each of a plurality of time steps comprises:
   determining that two or more illumination line segments overlap; and
   calculating illumination values for overlapping portions of the line segments based on blending colors in the overlapping portions.

9. The method of claim 1, wherein the plurality of time steps correspond with an operating frequency of the one or more real-time processors.

10. A system comprising:
a non-real-time processing system;
one or more first storage devices storing instructions that are operable, when executed by the non-real-time processing system, to cause non-real-time processing system to perform non-real-time operations comprising:
receiving data defining a light illumination pattern for a robotic system, and
generating, based on the data, a spline that represents the light illumination pattern, wherein a knot vector of the spline defines a timing profile of the light illumination pattern;
a real-time processing system arranged to receive spline data from the non-real time processing system and interface with one or more output component control systems of a robotic system; and
one or more second storage devices storing instructions that are operable, when executed by the real-time processing system, to cause real-time processing system to perform real-time operations comprising:
receiving the spline from the non-real-time processing system,
calculating an illumination value from the spline at each of a plurality of time steps, and
controlling illumination of a lighting display of the robotic system in accordance with the illumination value of the spline at each respective time step.

11. The system of claim 10,
wherein the non-real-time operations further comprise:
receiving data defining a motion pattern for the robotic system;
generating based on the data, a second spline that represents the motion pattern, wherein a knot vector of the second spline defines a second timing profile that represents timing of the motion pattern; and
synchronizing the timing profile of the light illumination pattern and the second timing profile, and
wherein the real-time operations further comprise:
receiving the second spline from the non-real-time processing system;
calculating a position value from the second spline at each of a plurality of time steps; and
controlling a movement of the robotic system in accordance the position value of the second spline at each respective time step.

12. The system of claim 10, wherein the data defining the light illumination pattern is an animation file.

13. The system of claim 10, wherein the data defining the light illumination pattern comprises programming code that describes the light illumination pattern by defining an illumination line segment for the lighting display.

14. The system of claim 13, wherein the programming code includes a start point and an end point for the line segment.

15. The system of claim 13, wherein the programming code includes an indication of a time dependent transition of the line segment.

16. A robotic device comprising:
a non-real-time processing system configured to perform non-real-time operations comprising:
receiving data defining a light illumination pattern for the robotic device, and
generating, based on the data, a spline that represents the light illumination pattern, wherein a knot vector of the spline defines a timing profile of the light illumination pattern; and
a real-time processing system arranged to receive spline data from a non-real time processing system and interface with one or more output component control systems of the robotic device, the real time processing system configured to perform real-time operations comprising:
receiving the spline from the non-real-time processing system,
calculating an illumination value from the spline at each of a plurality of time steps, and
controlling illumination of a lighting display of the robotic device in accordance with the illumination value of the spline at each respective time step.

17. The device of claim 16,
wherein the non-real-time operations further comprise:
receiving data defining a motion pattern for robotic device;
generating based on the data, a second spline that represents the motion pattern, wherein a knot vector of the second spline defines a second timing profile that represents timing of the motion pattern; and
synchronizing the timing profile of the light illumination pattern and the second timing profile, and
wherein the real-time operations further comprise:
receiving the second spline from the non-real-time processing system;
calculating a position value from the second spline at each of a plurality of time steps; and
controlling a movement of the robotic device in accordance the position value of the second spline at each respective time step.

18. The device of claim 16, wherein the data defining the light illumination pattern is an animation file.

19. The device of claim 16, wherein the data defining the light illumination pattern comprises programming code that describes the light illumination pattern by defining an illumination line segment for the lighting display.

20. The device of claim 19, wherein the programming code includes a start point and an end point for the line segment.

* * * * *